United States Patent [19]

Limper

[11] Patent Number: 5,080,264

[45] Date of Patent: Jan. 14, 1992

[54] APPARATUS FOR FEEDING BULK MATERIAL

[75] Inventor: Andreas Limper, Wenden/Schonau, Fed. Rep. of Germany

[73] Assignee: Signode Corporation, Glenview, Ill.

[21] Appl. No.: 484,608

[22] Filed: Feb. 22, 1990

[30] Foreign Application Priority Data

Feb. 23, 1989 [DE] Fed. Rep. of Germany ....... 3905535

[51] Int. Cl.$^5$ .............................................. G01F 11/20
[52] U.S. Cl. ...................................... 222/241; 222/413
[58] Field of Search ............... 222/185, 236, 239, 240, 222/241, 242, 413; 198/550.1; 241/260.1, 283; 366/40, 303

[56] References Cited

U.S. PATENT DOCUMENTS

| 567 | 1/1838 | Duvall | 366/303 |
| 621,203 | 3/1899 | Ballbach | 366/303 |
| 3,183,553 | 5/1965 | Slater | 222/241 |
| 4,778,276 | 10/1988 | Meyer et al. | 366/40 |

*Primary Examiner*—Michael S. Huppert
*Assistant Examiner*—Philippe Derakshani
*Attorney, Agent, or Firm*—Schwartz & Weinrieb

[57] ABSTRACT

Apparatus for feeding bulk material, such as, for example, chips, shavings, or the like, into a spiral pump or press, comprises a supply funnel, a feed line, and a rotatably driven conveying and compacting means. The latter comprises a vertically oriented axial shaft which comprises a helicoid portion within the vicinity of the supply funnel, and a helical thread portion within the vicinity of the feed line. The helicoid portion is spaced from the inner peripheral surface of the supply funnel by means of a predetermined spacing, and the inner peripheral surface of the supply funnel is provided with a plurality of pins equiangularly disposed about the inner periphery or circumferential extent of the supply funnel. The pins are arranged within a horizontal plane, and may be disposed within multiple horizontal planes. The pins may also have different lengths depending upon the particular bulk material being fed, conveyed, and compacted, and the helicoid portion of the axial shaft is provided with recesses defined within peripheral portions thereof for accommodating the pins of the supply funnel so as to permit the axial shaft, and the helicoid portion thereof, to rotate so as to feed, convey, and compact the bulk material.

10 Claims, 1 Drawing Sheet

APPARATUS FOR FEEDING BULK MATERIAL

FIELD OF THE INVENTION

The present invention relates generally to apparatus for feeding bulk material, such as, for example, chips, shavings, or the like, into a spiral pump or press, and more particularly to an apparatus of the aforenoted type which can in fact exhibit improved or enhanced conveying or compacting performance.

BACKGROUND OF THE INVENTION

Various different types of apparatus for conveying or feeding bulk material are of course well known, however, it has also been realized that in practice, the conveying or compacting capabilities or performance of such apparatus has been generally unsatisfactory due to internal frictional forces or effects developed within the apparatus, particularly when the bulk material exhibits a predetermined specific weight. In order to therefore improve the conveying and compacting capabilities or performance of such conventional apparatus, it is further known that the inner wall portions of the conveying or feeding funnel has been provided with grooves that extend into the feed line. The provision of such grooves within the inner wall portions of the conveying or feeding funnel, however, dramatically increase the manufacturing costs of the apparatus, and therefore, such is not particularly feasible or desirable from an economic viewpoint.

OBJECTS OF THE INVENTION

Accordingly, it is an object of the present invention to provide a new and improved apparatus for feeding bulk material.

Another object of the present invention is to provide a new and improved apparatus for feeding bulk material which can effectively overcome the various drawbacks and disadvantages of conventional or prior art apparatus of this type.

Still another object of the present invention is to provide a new and improved apparatus for feeding bulk material which can exhibit enhanced or improved conveying or compacting capabilities or performance without the necessity of incorporating grooves within the inner wall portions of the conveying or feeding funnel.

SUMMARY OF THE INVENTION

The foregoing and other objectives of the present invention are achieved through means of the provision of an apparatus for feeding bulk material which comprises a supply funnel, the distal or downstream end of which leads into a feed line, and a rotatably driven conveying and compacting means. The rotatably driven conveying and compacting means is seen to more particularly comprise a central or axial rotary shaft upon which is integrally formed an operative helix which, within the vicinity of the supply funnel, has the configuration of a helicoid, and within the vicinity of the feed line, has the configuration of a helical screw. The helicoid portion of the operative helix is radially spaced by means of a predetermined distance from the inner peripheral wall of the supply funnel, and a plurality of pins extend radially inwardly from the inner peripheral wall of the supply funnel. Concomitantly, the helicoid is provided with radially extending recesses or cut-out type apertures for operatively cooperating with the supply funnel pins in order to effectively accommodate the same as the helicoid rotates relative to the supply funnel and the interior peripheral wall portion or surface thereof. The pins are equiangularly spaced about the inner periphery of the supply funnel and may be disposed within multiple rows axially spaced apart with respect to each other. The length of each of the pins is approximately equal to at least one half of the radius of the supply funnel, however, in order to optimally adapt the apparatus of the present invention to conveying and compacting operations with respect to predetermined bulk materials, the pins can have lengths other than that specified. For example, while the length of the pins has generally been noted as being approximately equal to one-half of the radius of the supply funnel, as considered within the plane within which the pins are located, the pins can be provided with an effective length greater than such one-half radius when, for example, the particular bulk material being conveyed and compacted is especially difficult to convey or compact.

As can be appreciated, the conveying and compacting performance capabilities of the apparatus can be significantly improved by means of the incorporation of the aforenoted pins within the inner peripheral wall surfaces of the supply funnel, and as can be further appreciated, the conveying and compacting performance capabilities of the apparatus can be altered, so as to, for example, be capable of conveying or compacting different types of bulk materials, by simply exchanging one set of pins for another set of pins. Accordingly, the apparatus of the present invention can be effectively employed to convey or compact various different bulk materials, such as, for example, chips or shavings or like which may be paper, metal, plastic, plastic-coated paper, plastic-coated metal foil, and the like.

BRIEF DESCRIPTION OF THE DRAWINGS

Various other objects, features, and attendant advantages of the present invention will become better understood from the following detailed description, when considered in connection with the accompanying drawings, in which like reference characters designate like or corresponding parts throughout the several views, and wherein.

DETAILED DESCRIPTION OF THE PREFERRED EMBODIMENT

Figure 1:
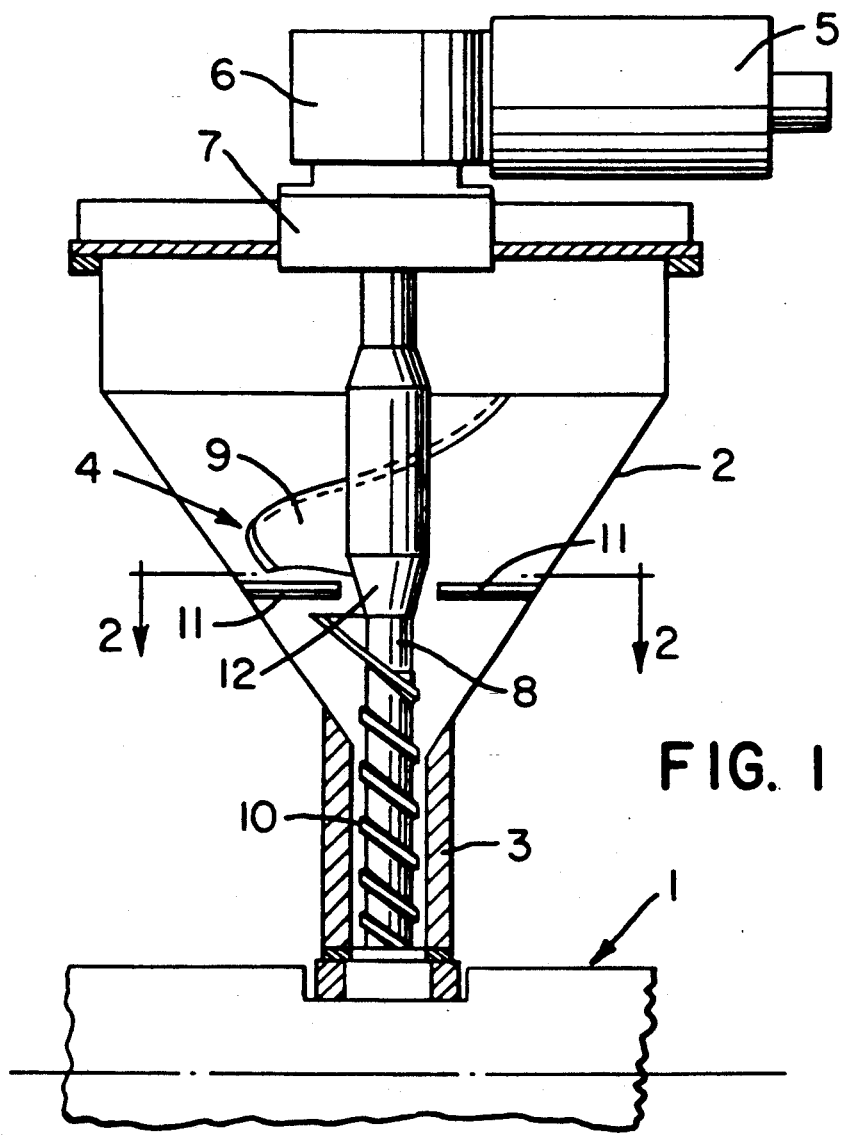
FIG. 1 is a vertical cross-sectional view of the new and improved apparatus for feeding bulk material as constructed in accordance with the present invention.

Referring now to the drawings, and more particularly to FIG. 1 thereof, the new and improved apparatus for feeding bulk material as constructed in accordance with the present invention is seen to be adapted for feeding bulk material, such as, for example, chips, shavings, or the like, into a spiral pump or press 1. More particularly, the apparatus of the present invention is seen to comprise a supply funnel 2, the distal end of which merges into a feed line 3, and within which there is rotatably disposed a conveying and compacting means generally indicated by the reference character 4. The conveying and compacting means 4 is seen to comprise a vertically oriented axial shaft 8, and an operative helix fixedly or integrally formed thereon. More particularly, it is seen that the operative helix comprises a helicoid 9 disposed within the supply funnel 2 and radially spaced from the inner peripheral wall thereof by means of a predetermined spacing or gap, and a screw thread, including screw lands 10, within the feed line 3.

The upper end of axial shaft 8 is operatively connected to a gearbox 6 which, in turn, is operatively connected to a suitable electric drive motor 5, and it is further seen that the motor 5 and gearbox 6 are supported upon a cross member 7 which diametrically spans the upper end of the supply funnel 2.

Figure 2:
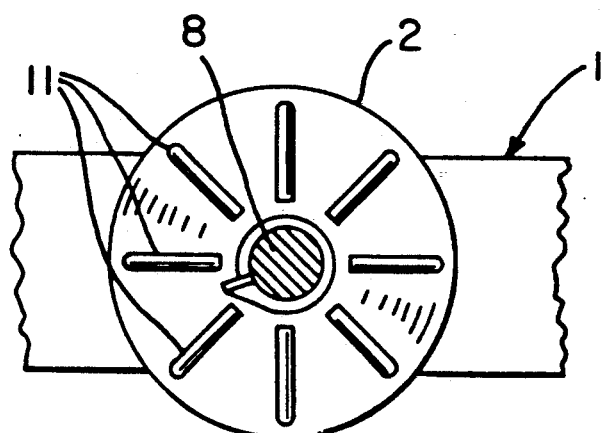
FIG. 2 is a cross-sectional view of the apparatus of FIG. 1 as taken along the line 2—2 of FIG. 1.

With additional reference now being made to FIG. 2, it is further appreciated that in accordance with the present invention, the supply funnel 2 is provided with a plurality of radially inwardly projecting pins 11, and in connection therewith, the helicoid portion 9 of the axial shaft element 8 is provided with a plurality of recesses 12 which correspond in axial location with respect to the location of the pins 11 of the supply funnel 2, that is, within the same horizontal plane thereof, so as to permit the helicoid portion 9 of the shaft element 8 to rotate past or relative to pins 11. The pins 11 generally have a length which is approximately equal to one half of the radius of the supply funnel 2 as determined within the horizontal plane within which the pins 11 are located, however, depending upon the particular bulk material being processed, the particular length of the pins 11 can be greater or less than such aforenoted radial length. In addition, the pins 11 can be located within several different or multiple horizontally disposed, axially spaced planes, and accordingly, the apparatus of the present invention can therefore be used to feed, convey, or compact various different types of bulk materials.

Obviously, many modifications and variations of the present invention are possible in light of the above teachings. It is therefore to be understood that within the scope of the appended claims, the present invention may be practiced otherwise than as specifically described herein.

I claim:

1. Apparatus for feeding bulk material, comprising:
a feed line;
a supply funnel connected to said feed line for conducting said bulk material toward and into said feed line; and
rotary driven conveying and compacting means disposed within said feed line and said supply funnel;
said supply funnel comprising a plurality of pins fixedly mounted upon said supply funnel an projecting inwardly into interior portions of said supply funnel;
said rotary driven conveying and compacting means comprising a rotary shaft coaxially disposed with respect to said feed line and said supply funnel, a screw thread portion being integrally formed upon a first portion of said rotary shaft disposed within said feed line, and a helicoid integrally formed upon a second portion of said rotary shaft disposed within said supply funnel, said helicoid comprising a surface the peripheral edge portions of which are spaced from interior wall portions of said supply funnel, and wherein said helicoid surface comprises recess means formed therein for permitting said helicoid to rotate with respect to said supply funnel without interfering with and encountering said inwardly projecting pins of said supply funnel whereby said recess means of said helicoid cooperate with said pins of said supply funnel so as to convey and compact said bulk material.

2. Apparatus as set forth in claim 1, wherein:
said pins of said supply funnel extend radially inwardly into said supply funnel.

3. Apparatus as set forth in claim 2, wherein:
said pins of said supply funnel are disposed in a circumferential array and in a coaxial manner with respect to said supply funnel.

4. Apparatus as set forth in claim 3, wherein:
said pins are disposed within a single horizontal plane disposed substantially perpendicular to an axis of said apparatus defining said coaxial disposition of said feed line, said supply funnel, and said rotary driven conveying and compacting means.

5. Apparatus as set forth in claim 3, wherein:
said pins are disposed in an equiangularly spaced manner with respect to each other within said circumferential array.

6. Apparatus as set forth in claim 4, wherein:
each of said pins has a length which is equal to at least one half of the radius of said supply funnel as defined within said horizontal plane within which said pins are disposed.

7. Apparatus as set forth in claim 1, wherein:
said screw thread portion and said helicoid are integrally formed together in a continuous manner upon said rotary shaft.

8. Apparatus as set forth in claim 1, further comprising:
support means diametrically spanning a large diameter portion of said supply funnel; and
motor drive means fixedly mounted upon said support means and operatively connected to said rotary shaft for driving said rotary shaft, said screw thread portion thereof, and said helicoid thereof.

9. Apparatus as set forth in claim 8, wherein said motor drive means comprises:
an electric motor; and
a gearbox interposed between said electric motor and said rotary shaft.

10. Apparatus as set forth in claim 3, wherein:
said pins are disposed within at least one horizontal plane disposed substantially perpendicular to an axis of said apparatus defining said coaxial disposition of said feed line, said supply funnel, and said rotary driven conveying and compacting means.

* * * * *